(12) United States Patent
Liu et al.

(10) Patent No.: US 11,223,036 B2
(45) Date of Patent: Jan. 11, 2022

(54) INTERCONNECTED SILICON POROUS STRUCTURE FOR ANODE ACTIVE MATERIAL

(71) Applicant: Apple Inc., Cupertino, CA (US)

(72) Inventors: Zuqin Liu, Sunnyvale, CA (US); Richard M. Mank, Cupertino, CA (US); Hyea Kim, Campbell, CA (US); Hongli Dai, Los Altos, CA (US); Sunho Kang, San Jose, CA (US); Ji-Guang Zhang, Richland, WA (US); Ran Yi, Richland, WA (US); Qiuyan Li, Richland, WA (US); Xiaolin Li, Richland, WA (US); Wu Xu, Richland, WA (US); Rajankumar L. Patel, Richland, WA (US); Hyung-Seok Lim, Richland, WA (US); Chongmin Wang, Richland, WA (US); Langli Luo, Richland, WA (US); Yang He, Richland, WA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 16/686,889

(22) Filed: Nov. 18, 2019

(65) Prior Publication Data
US 2020/0161635 A1    May 21, 2020

Related U.S. Application Data

(60) Provisional application No. 62/769,222, filed on Nov. 19, 2018.

(51) Int. Cl.
*H01M 4/134* (2010.01)
*H01M 10/0525* (2010.01)
(Continued)

(52) U.S. Cl.
CPC .......... *H01M 4/134* (2013.01); *H01M 4/133* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| 9,209,456 B2 | 12/2015 | Fasching et al. |
| 2018/0034056 A1 | 2/2018 | Cho et al. |

(Continued)

OTHER PUBLICATIONS

Yao, Y., et al., "Interconnected Silicon Hollow Nanospheres for Lithium-Ion Battery Anodes With Long Cycle Life", NanoLetters, ACS Publications, Jun. 1, 2011, pubs.acs.org/NanoLett (6 pp).

(Continued)

*Primary Examiner* — Wyatt P McConnell
(74) *Attorney, Agent, or Firm* — Young Basile Hanlon & MacFarlane, P.C.

(57) ABSTRACT

An anode active material comprises a silicon-carbon secondary particle comprising a composite having an exterior conformal carbon coating and formed of type I primary particles. Each type I primary particle comprises a core particle of interconnected silicon, the interconnected silicon formed of nano-sized silicon particles each connected to at least one other particle, inner pores internal to the core particle and defined by the interconnected silicon, an internal carbon coating on internal wall surfaces of the inner pores and a conformal carbon coating on the core particle.

23 Claims, 7 Drawing Sheets

(51) Int. Cl.
  *H01M 4/133* (2010.01)
  *H01M 4/02* (2006.01)

(56) References Cited

U.S. PATENT DOCUMENTS

2018/0145316 A1* 5/2018 Moon .................... H01G 11/42
2019/0006679 A1   1/2019 Jeong et al.
2019/0157668 A1   5/2019 Moon

OTHER PUBLICATIONS

Luo, W., et al., "Surface and Interface Engineering of Silicon-Based Anode Materials for Lithium-Ion Batteries", Advanced Energy Materials, 2017, www.advenergymat.de, Review, Lithium-Ion Batteries, (28 pp).

Yi, R., et al., "Micro-sized Si—C Composite With Interconnected Nanosacle Building Blocks as High-Performance Anodes for Practical Application in Lithium-Ion Batteries", Advanced Energy Materials, 2013, www.advenergymat.de, (6 pp).

Wang, D., et al., "Synthesis and Characterization of Structured Si-Carbon Nanocomposite Anodes and Functional Polymer Binders", Project ID ES147, The Pennsylvania State University, Jun. 17, 2014, (23 pp).

\* cited by examiner

INTERCONNECTED SILICON POROUS STRUCTURE FOR ANODE ACTIVE MATERIAL

CROSS-REFERENCE TO RELATED APPLICATION(S)

This application claims priority to and the benefit of U.S. Provisional Application Patent Ser. No. 62/769,222, filed Nov. 19, 2018, the entire disclosure of which is hereby incorporated by reference.

U.S. GOVERNMENT LICENSE RIGHTS

The Government has rights in this invention pursuant to the Development Agreement, Contract No. C56-16-00826.

TECHNICAL FIELD

This disclosure relates to anode material for lithium ion batteries having a core interconnected structure of silicon nanoparticles defining internal pores, the internal pores coated in carbon and an exterior surface of the core coated in carbon.

BACKGROUND

Silicon is a potential anode material for next generation lithium-ion batteries. Silicon has a theoretical capacity of 4200 mAh/g, ten times higher than that of graphite. However, silicon suffers intrinsic volume change of about 300-400% during lithiation and delithiation due to its alloying nature, which leads to destruction and/or cracking of electrodes and/or delamination of silicon active materials from current collector, and continuous consumption of electrolyte and growth of solid electrolyte interphase (SEI) layer, an electrically insulating layer. As a result, silicon generally shows a very short cycling life, which makes its practical application difficult.

SUMMARY

Disclosed herein is a silicon-carbon secondary particle for use as anode active material in lithium-ion batteries. Also disclosed is an anode active material comprising the silicon-carbon secondary particles, and lithium-ion batteries using the disclosed anode active material.

Silicon-carbon secondary particles each comprises a composite having an exterior conformal carbon coating and formed of type I primary particles. Each type I primary particle comprises a core particle of interconnected silicon, the interconnected silicon formed of nano-sized silicon particles each connected to at least one other nano-sized silicon particle, inner pores internal to the core particle and defined by the interconnected silicon, an internal carbon coating on internal wall surfaces of the inner pores and a conformal carbon coating on the core particle.

The core particle consists essentially of silicon and carbon prior to use, with more silicon by atomic wt. % than carbon, the silicon forming an interconnected structure providing continuous silicon pathways throughout the core particle. Inner pores within the core particle are defined by the interconnected structure, and surfaces of the inner pores are coated with carbon. An exterior carbon coating seals the core particle.

In embodiments, the composite further comprises type II primary particles each comprising a single nano-sized silicon particle having a conformal carbon coating, wherein the type I primary particles and the type II primary particles are loosely bonded, allowing for movement of individual primary particles.

In embodiments, the composite further comprises type III primary particles each comprising multiple nano-sized silicon particles chemically bonded together and conformally coated with carbon, wherein the type I primary particles, the type II primary particles and the type III primary particles are loosely bonded, allowing for movement of individual primary particles.

In embodiments, the type I primary particles and the type III primary particles are loosely bonded, allowing for movement of individual primary particles.

In embodiments, the core particle can have an inner porosity provided by the inner pores of between 20% and 30%, inclusive.

In embodiments, the type secondary particles each have a porosity of between 10% and 40%, inclusive.

In embodiments, the inner pores can have a mean dimension of between 2 nm to 5 nm, inclusive.

In embodiments, the silicon-carbon secondary particle can have a D50 diameter of between 1 μm and 10 μm, inclusive.

In embodiments, the nano-sized silicon particles each can have a longest dimension of 10 nm or less.

In embodiments, the nano-sized silicon particles each can have a mean dimension of between 2 nm and 5 nm, inclusive.

In embodiments, the exterior carbon coating can have a thickness of between 2 nm and 5 nm, inclusive.

In embodiments, the interconnected silicon can form internal walls within the core particle having a thickness of at least 2 nm.

In embodiments, the silicon-carbon secondary particle may further comprise an artificial solid electrolyte interphase layer on the exterior carbon coating.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Porous silicon and porous silicon oxides have been explored as a potential solution to the large volume change experienced during lithiation and delithiation as the porosity provides a buffer zone for silicon expansion. However, the intrinsic properties of a porous structure poses disadvantages, including at least the following: 1) the high surface area could lead to formation of a large amount of SEI, causing low coulombic efficiency; 2) the large pore volume requires more electrolyte to wet active materials which in turn decreases the energy density of lithium-ion batteries and makes the electrode preparation difficult as more binder solvent is needed; and 3) the porous structure weakens the mechanical strength compared to its solid counterpart. In addition, silicon has low electrical conductivity due to its semiconductor nature, which limits its rate capability during fast charge/discharge.

Figure 1:
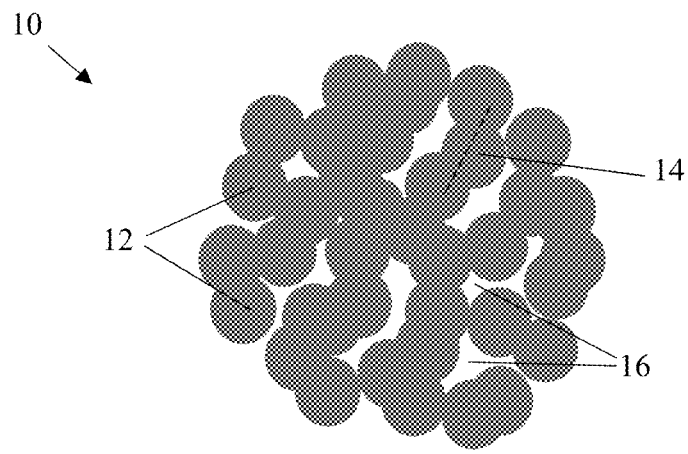
FIG. 1 is a schematic of a core particle having an interconnected silicon structure as disclosed herein.
Figure 2:
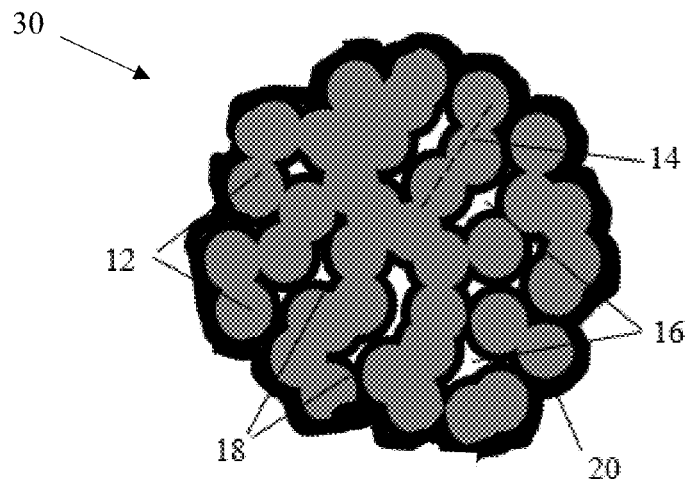
FIG. 2 is a schematic of a type I primary particle as disclosed herein.

To solve the issues above, a silicon-carbon secondary particle has been developed for use as anode active material in lithium ion batteries. The silicon-carbon secondary particle is a composite of type I primary particles and may include one or both of type II primary particles and type III primary particles. The type I primary particles each have a core particle consisting essentially of interconnected silicon. This interconnected silicon structure is formed of nano-sized silicon particles, with little to no silicon oxide present internal to the structure. As used herein, "interconnected" means that the silicon particles in the structure are each fused to at least one other silicon particle to form a continuously connected structure having continuous silicon pathways throughout the core particle. The core particle 10 with the interconnected silicon structure is illustrated in FIG. 1. The interconnected structure of the core particle 10 is formed of nano-sized silicon particles 12 interconnected to form internal walls 14, an example of which is illustrated by the broken line. The internal walls 14 define internal pores 16 within the core particle 10. To form the type I primary particle 30, the internal pores 16 are coated with a thin layer of carbon 18, such as amorphous carbon, and the exterior surface of the interconnected structure is coated with a conformal coating 20 of carbon, as illustrated in FIG. 2. This increases the overall conductivity of the type I primary particle 30 by forming a conductive coating connecting the nano-sized silicon particles 12. The void space provided by the internal pores can accommodate the volume change of the silicon, thus maintaining the integrity of the structure free of cracking during charge/discharge. The thin coating of the carbon 18 on the internal walls increases the conductivity while maintaining the void space that absorbs the particle expansion. The interconnected structure with the carbon coating throughout also improves its mechanical strength, making high pressure electrode calendering of the silicon-carbon secondary particles viable.

The interconnected silicon structure of the core particle 10 is formed with nano-sized silicon particles 12 having a D50 particle diameter of between 3 nm and 6 nm, inclusive and each having a longest diameter of less than or equal to 10 nm. The nano-sized silicon particles 12 each having a diameter of 10 nm or less swell considerably less than silicon particles larger than 10 nm. The interconnected silicon structure formed with nano-sized silicon particles each having a diameter of less than or equal to 10 nm results in much lower volume expansion when compared to a silicon or silicon oxide particle of equivalent overall size due in part to high pore utilization. The interconnected silicon structure is formed with a requisite porosity, allowing in part for its isotropic swelling when equivalent-sized silicon or silicon oxide particles swell anisotropically. This isotropic expansion is translated to the silicon-carbon secondary particle. The isotropic swelling of the secondary particle provides for better utilization of void space between secondary particles that form the anode active material layer, further diminishing the volume expansion. Because the core interconnected silicon particle 10 is formed of nano-sized silicon particles 12, in combination with the internal pore volume defined internal to the structure, the interconnected silicon structure will swell to only 100% or less than its original size, and in particular to between 70% and 100%, inclusive. This is a significant improvement over the 300% to 400% swelling occurring in conventional silicon-based particles.

The internal pores 16 within the interconnected silicon structure of the core particle 10 have a mean dimension between 2 nm and 5 nm, inclusive, after the carbon coating, providing empty void space into which the silicon can expand. The internal pores 16 provide the type I primary particle 30 with a porosity of between 20% and 30%, inclusive, after carbon coating. The porosity prior to carbon coating is between about 50% and 60%, which equates to a pore volume prior to carbon coating between about 0.60 $cm^3/g$ and 0.70 $cm^3/g$. The interconnected silicon structure has a large surface area prior to coating. The surface area is equal to or greater than 500 $m^2/g$, and can be equal to or greater than 750 $m^2/g$.

Figure 3:
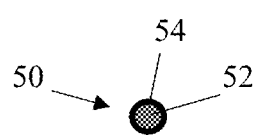
FIG. 3 is a schematic of a type II primary particle as disclosed herein.

The composite forming each silicon-carbon secondary particle can further include one or both of type II primary particles and type III primary particles. A type II primary particle 50, illustrated in FIG. 3, is a single nano-sized silicon particle 52 having a conformal carbon coating 54. Each single nano-sized silicon particle 52 has a diameter of less than or equal to 10 nm. The type I primary particles 30 and the type II primary particles 50 are loosely bonded in the silicon-carbon secondary particle, allowing for movement of individual type I and type II primary particles 30, 50.

Figure 4:
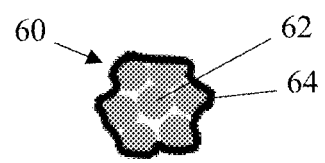
FIG. 4 is a schematic of a type III primary particle as disclosed herein.

A type III primary particle 60, illustrated in FIG. 4, has multiple nano-sized silicon particles 62 chemically bonded together and conformally coated with carbon 64. In an embodiment, the type I primary particles 30 and the type III primary particles 60 are loosely bonded, allowing for movement of individual primary particles. In another embodiment, the type I primary particles 30, the type II primary particles 50 and the type III primary particles 60 are loosely bonded, allowing for movement of individual primary particles within the silicon-carbon secondary particle.

Figure 5:
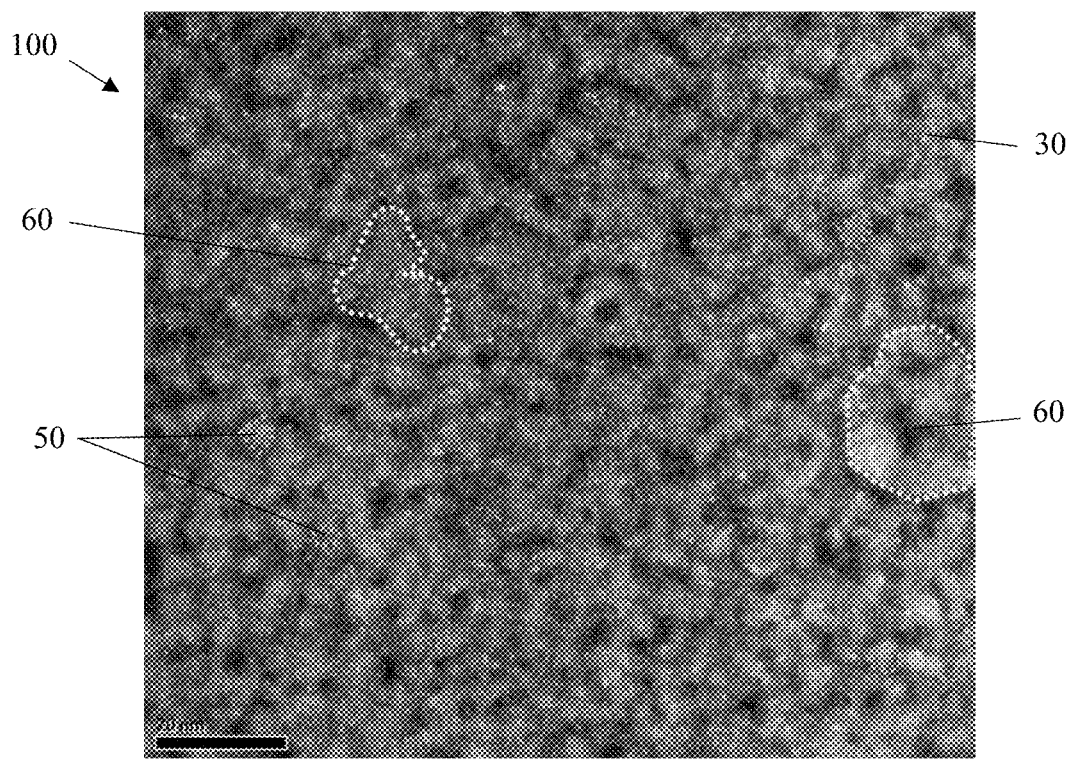
FIG. 5 is a transmission electron microscopic (TEM) image of a cross section of a silicon-carbon secondary particle as disclosed herein.
Figure 6:
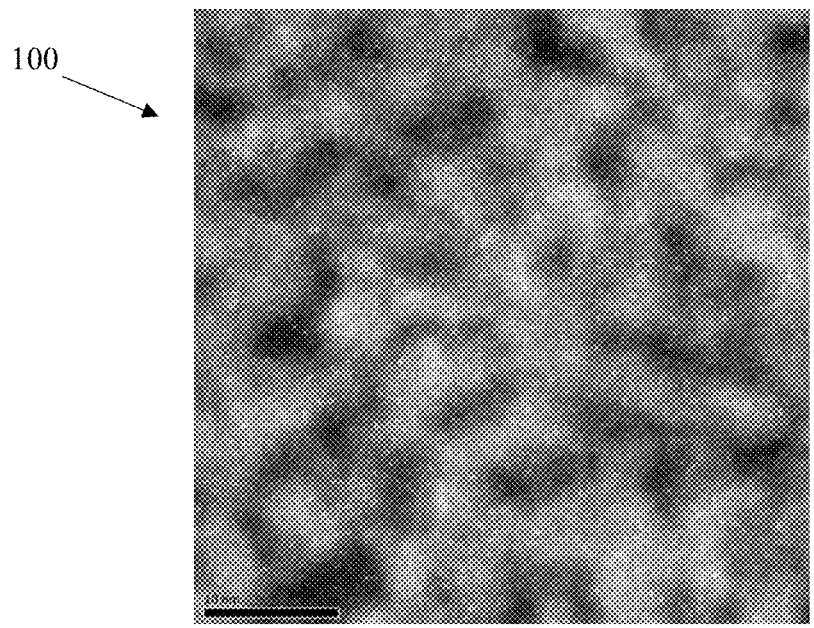
FIG. 6 is an enlarged portion of the TEM image of FIG. 5.
Figure 7A:
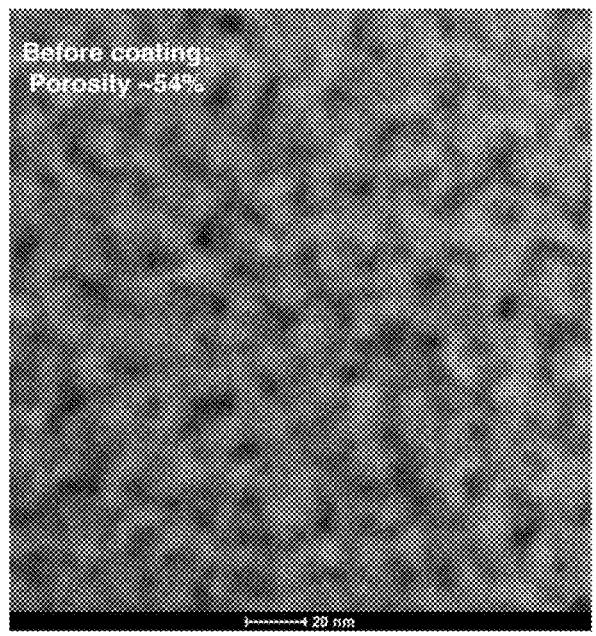
FIGS. 7A and 7B are scanning TEM (STEM) images of the interconnected silicon structure prior to coating the internal walls with carbon and after coating the internal walls with carbon, respectively.
Figure 7B:
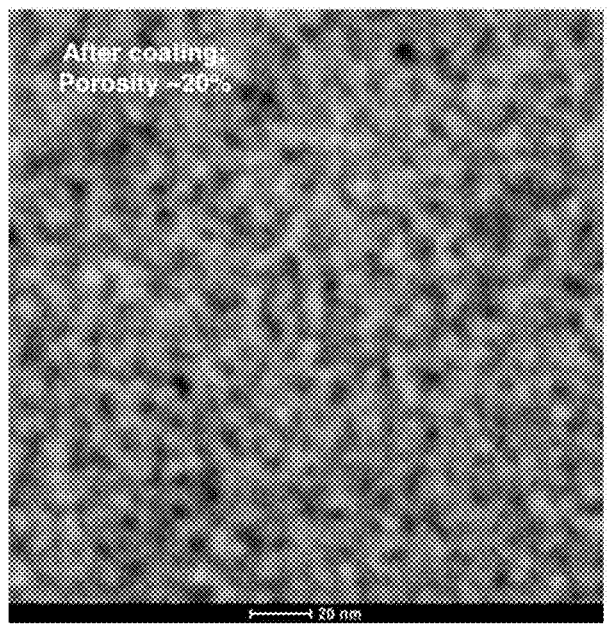

FIG. 5 is a high-resolution energy dispersive X-ray spectroscopy (EDS) TEM image of a cross section of a silicon-carbon secondary particle 100. FIG. 6 is an enlarged view of the interconnected silicon of the type I primary particles 30 and the internal pores. As illustrated, distribution of the inner pores is quite uniform through the core particle. Type II primary particles 50 and type III primary particles 60 are also highlighted in FIG. 5. The silicon-carbon secondary particle 100 is micro-sized, with the overall D50 diameter of the silicon-carbon secondary particle 100 being 3 µm to 5 µm, inclusive. FIGS. 7A and 7B are high resolution STEM images of a cross-section of the interconnected silicon of the type I primary particles 30 and the internal pores 16 before and after the thin coating of the carbon 18 on the internal walls of the pores. FIG. 7A is prior to coating, measuring a porosity of 54%, while FIG. 7B is after the coating of carbon, resulting in a porosity of 20%.

Figure 8:
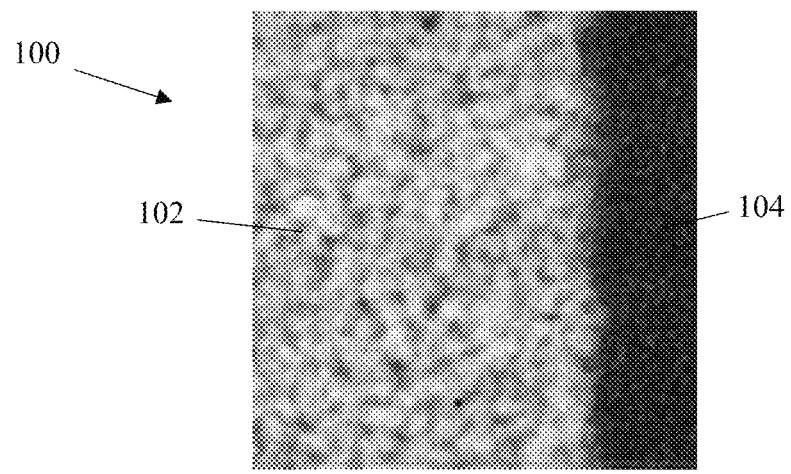
FIG. 8 is a TEM image of a cross-section of the silicon-carbon secondary particle at the border of the composite and the conformal coating.

The exterior surfaces, including pores and crevices, of the composite 102 of the silicon-carbon secondary particle 100 are fully filled with carbon, blocking penetration of binder solution and electrolyte into the otherwise highly porous inner structure with high surface area, allowing for only minimum formation of an SEI layer on the outer surface only. FIG. 8 is a high resolution TEM image of a cross-section of a silicon-carbon secondary particle 100 along the interface between the composite 102 and the exterior conformal carbon coating 104.

The silicon-carbon secondary particle 100 is between about 10 wt. % and 45 wt. % carbon, which is uniformly distributed as the coating on inside surfaces of the interconnected silicon structure of the core particle 10 of the type I primary particle 30, coated on the type I, type II and type III primary particles 30, 50, 60, and coated on the exterior surface of the composite 102. The exterior conformal carbon coating 104, which seals the surface of the secondary particle 100, is between about 2 nm to 5 nm, inclusive, in thickness, and particularly between 2 nm to 3 nm, inclusive, in thickness. After the secondary particle 100 is coated with carbon, the surface area drops to 50 m$^2$/g or less. The internal pore volume and pore size can no longer be measured with gas adsorption analysis because the surface is sealed and the internal pores are no longer accessible to the gas. However, TEM analysis of a cross-section shows that the internal pores provide an overall porosity of between 10% and 40%, inclusive, and more particularly, between 20% and 40%, inclusive, for the silicon-carbon secondary particle 100.

Figure 9:
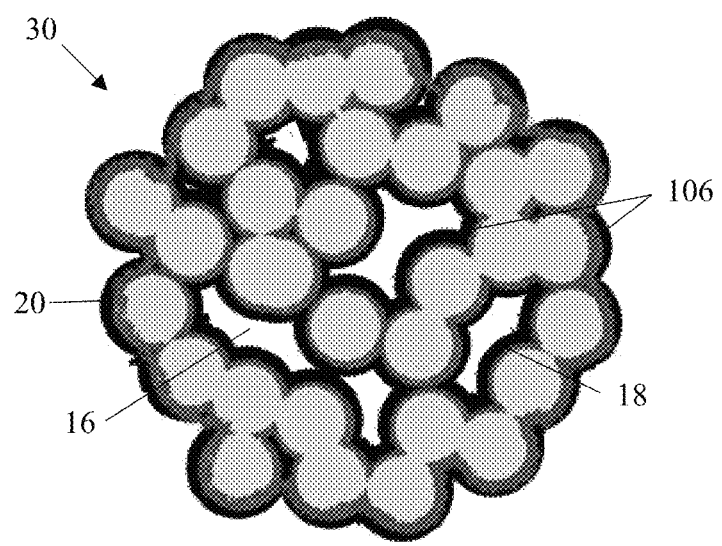
FIG. 9 is a schematic of a cross-section of a type I primary particle having a silicon-carbide layer as disclosed herein.

As illustrated in FIG. 9, the type I primary particles 30 can further include a silicon-carbide layer 106 between the internal wall surfaces of the inner pores 16 and the internal carbon coating 18 and between the core particle 10 and the conformal carbon coating 20. This interfacial silicon-carbide layer between the active core silicon and the carbon coating layer can stabilize the silicone anode's electrochemical performance. By assisting in confining particle volume swelling upon lithiation, particle and electrode degradation is decreased. The smaller particle swell maintains the nano-sized silicon particles within the core particle. Side reactions between the silicon core and the penetrating electrolyte are prevented.

The silicon-carbide layer is amorphous, which is important to allow lithium to pass through the silicon-carbide layer. The amorphous character of the silicon-carbide layer 106 allows for the alleviation of the particle swell during lithiation. Particle swell was measured by in-situ TEM analysis and was found to improve by about 16% with a thin layer of silicon-carbide and improved by about 35% with a more silicon-carbide. Because the silicon-carbide is not electrochemically active, the layer is kept to a thickness of less than 5 nm. With such a thin layer, the lithiation capacity and first coulomb efficiency is not significantly impacted. Keeping the layer thin also helps to preserve the porosity of the type I primary particle 30. Incorporating the silicon-carbide layer provides better cycle retention and higher coulombic efficiency, indicating the silicon-carbide layer stabilizes the electrochemical performance of the anode.

The silicon-carbide layer 106 is generated by temperature control during the carbon coating CVD processes. Because the nano-sized silicon particles are small, the silicon-carbide layer can be formed at temperatures less than 1000° C. Because of the way the layer is formed, the composition of the silicon-carbide layer includes a gradually decreasing amount of silicon towards the internal carbon coating 18 and the conformal carbon coating 20, and a gradually decreasing amount of carbon towards the core particle 10.

Figure 10:
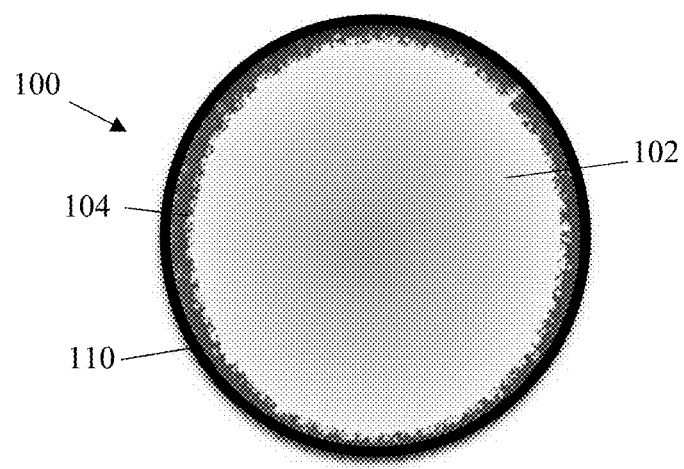
FIG. 10 is a schematic of a cross-section of the silicon-carbon secondary particle as disclosed herein.

The silicon-carbon secondary particle 100 can further include an artificial SEI layer 110 on the exterior carbon coating 104, as illustrated in FIG. 10. This compact, ultrathin artificial SEI layer 110 can be applied to the exterior carbon coating 104 to further reduce the side reaction between silicon and the electrolyte. The SEI layer should be flexible to tolerate the volume expansion of the particles. The artificial SEI layer can be a polymeric film, inorganic film, or a hybrid polymeric-inorganic film, as examples. The artificial SEI layer can be between 1 nm and 20 nm, inclusive, and more particularly, between 1 nm and 10 nm, inclusive.

Figure 11:
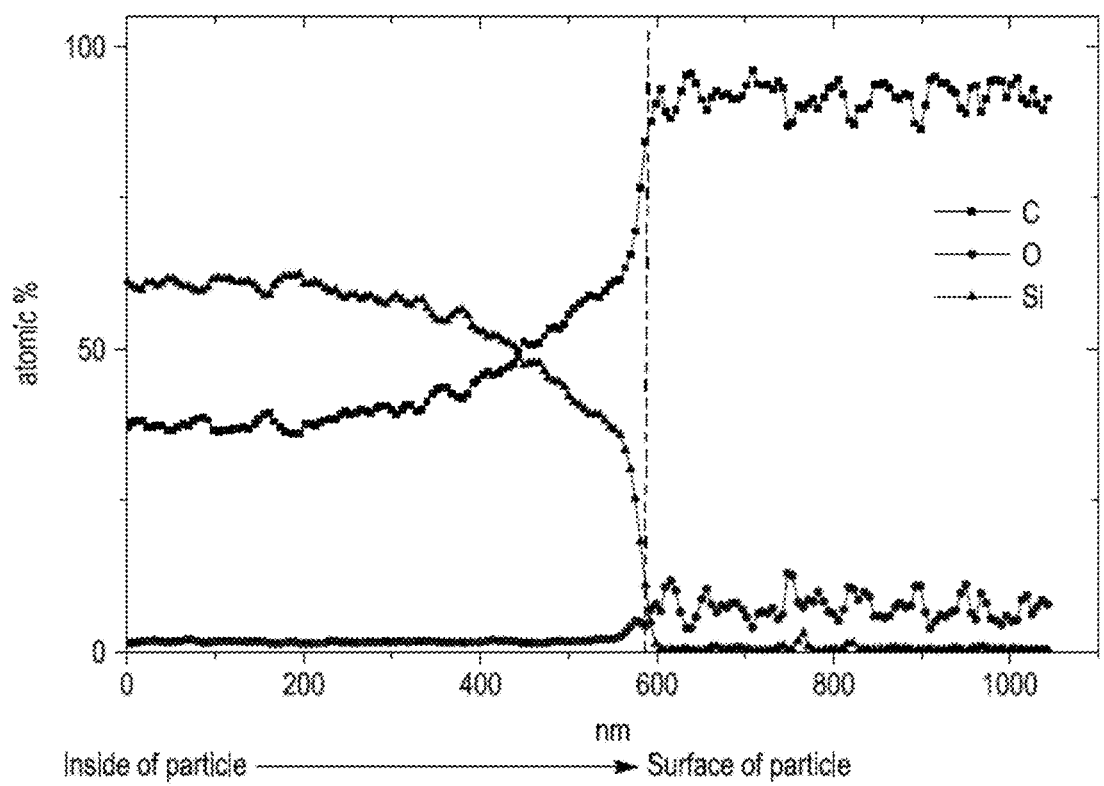
FIG. 11 is a graph showing the atomic wt. % of elements in the silicon-carbon secondary particle and how the elemental weights change from the core particle to the surface coating.

FIG. 11 illustrates the distribution of elements in the silicon-carbon secondary particle. The majority weight percent of the internal particle is silicon. The internal particle consists essentially of silicon and carbon, with the atomic wt. % of carbon increasing toward the surface of the particle. As shown, oxygen is not present until the surface of the particle is reached, the oxygen due to oxidation at the surface. The surface is nearly all carbon with some oxygen resulting from oxidation.

Methods of making the interconnected silicon structure of the type I primary particle 30 are provided as examples. One method includes using SiO$_x$ as a starting material prepared as particles having a diameter of between 1 µm and 10 µm, inclusive. The SiO$_x$ is heat treated at between about 800° C. and 1300° C. for a period of time. An example period of time is about one hour. The SiO$_x$ undergoes a phase separation due to the heat treatment to form nano-sized silicon particles embedded in silicon dioxide. The phase separated material is etched with acid to remove the silicon oxides, leaving the core particle 10 having the interconnected silicon structure. Carbon is coated onto the surfaces of the interconnected silicon structure. Vapor deposition can be used so that the carbon gas penetrates into the internal pores of the interconnected silicon structure. As non-limiting examples, CVD, ALD, MLD, and the like can be used to coat the carbon. As an example of ALD/MLD, polyurea can be formed by alternating pursing of 1,4-phenylenediisocyanate (PDIC) and ethylenediamine (ED). The polymer-coated Si is further heat treated to generate carbon coated Si.

As a non-limiting example of the method, precursors for SiO$_{1.5}$ are prepared by hydrolysis of triethoxysilane in 0.1 M hydrochloric acid solution under stirring at room temperature. The white precipitate silsesquioxane is collected by filtration and then dried under vacuum. The silsesquioxane powder is calcinated, and the powder is immersed in hydrofluoric acid solution for 1 hour to obtain porous Si powder. Carbon coating of Si powder is carried out using hydrocarbon precursors, such as acetylene, ethylene and methane, and additional carbon coating is done by mixing the resultant powder with coal tar pitch followed by subsequent carbonization.

An alternative method starts with $SiO_2$ powder and magnesium powder well mixed by grinding. The mixture is transferred to a stainless-steel reactor under inert atmosphere. The reactor is heat treated and the resultant powder is washed with 1M hydrochloric solution and then collected by filtration and drying. Carbon coating is performed as provided above.

As another alternative method, porous Si is prepared by electrochemical etching of boron-doped crystal Si wafers with constant current density for a period of time in hydrofluoric acid/ethanol electrolyte. Carbon coating is performed as provided above.

Figure 12:
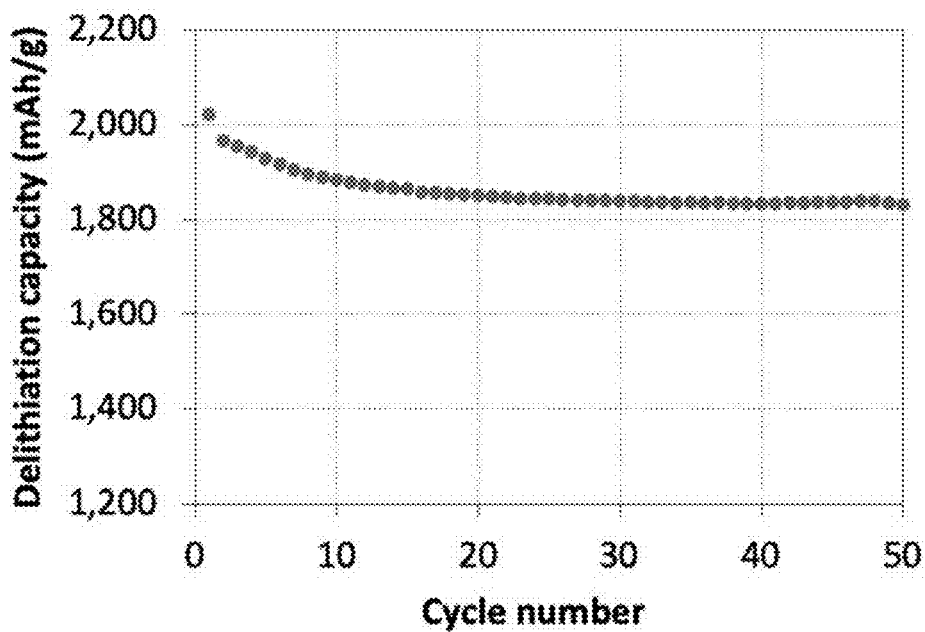
FIG. 12 is a graph of the capacity performance of a half cell operated with the silicon-carbon secondary particles disclosed herein.
Figure 13:
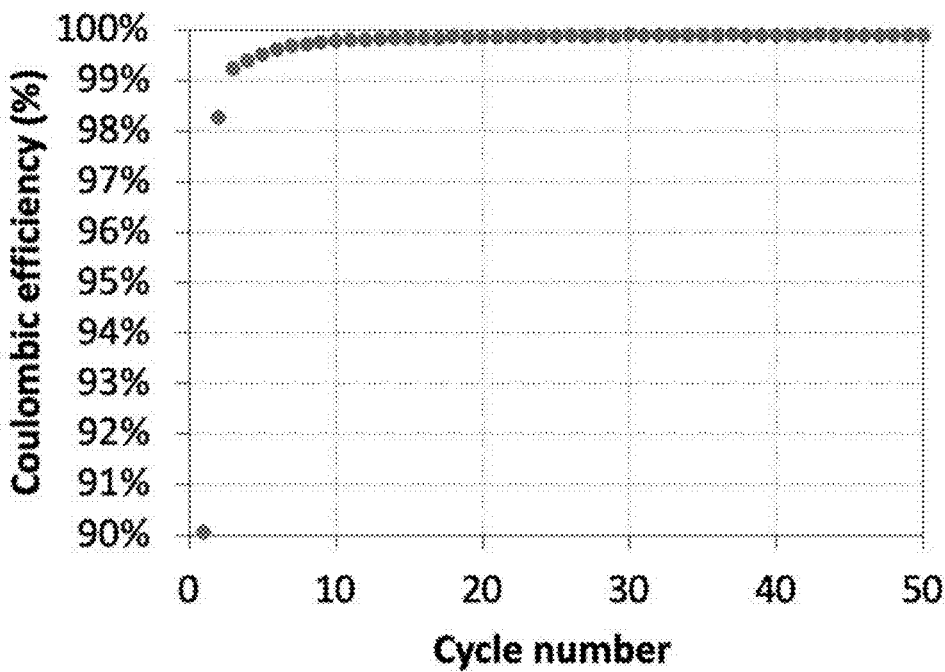
FIG. 13 is a graph of the coulombic efficiency of the half-cell operated with the silicon-carbon secondary particles disclosed herein.

An example silicon-carbon secondary anode material was made by the processes disclosed herein and cycled in a half cell. Performance is shown in FIGS. 12 and 13. The initial lithiation and delithiation capacities are 2245 and 2021 mAh/g, giving a $1^{st}$ coulombic efficiency (CE) of 90%. After 50 cycles, the capacity is around 1760 mAh/g with a capacity retention of 89%. The cycling CE is high, reaching 99.5% after cycle 5 and maintaining at that level afterwards. The average CE during 50 cycles (excluding $1^{st}$ cycle) is 99.8%.

Figure 14:
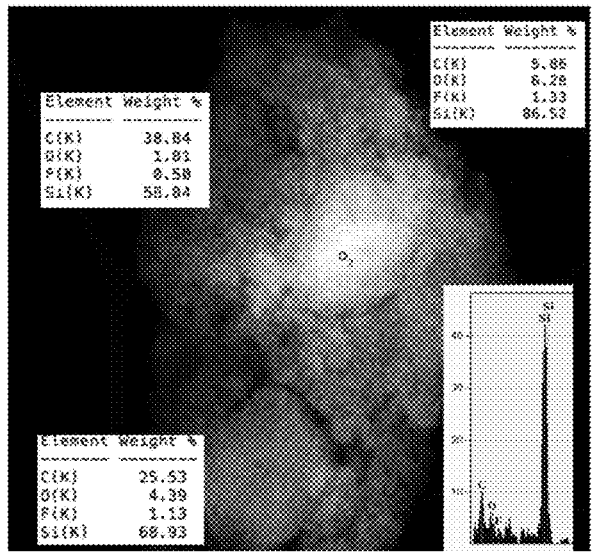
FIG. 14 is an image with analysis of a silicon-carbon secondary material analyzed by energy dispersive X-ray spectroscopy (EDS) after 50 cycles at delithiation status.
Figure 15:
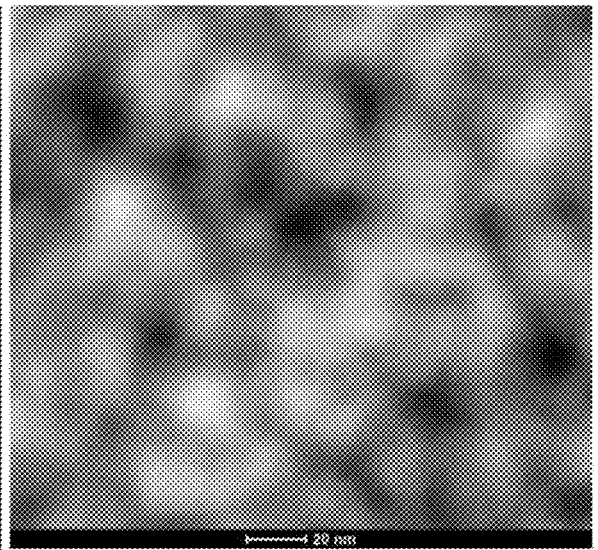
FIG. 15 is a STEM image of the silicon-carbon secondary material of FIG. 12.

The silicon-carbon secondary material was analyzed by EDS and STEM after 50 cycles at delithiation status, with the results shown in FIGS. 14 and 15. Fluorine concentration is a good indicator of electrolyte penetration because fluorine containing salt ($LiPF_6$) and solvent (FEC) are used in electrolytes. Only a trace of fluorine is detected through the particle. The fluorine concentration is also very low at the surface, evidencing that the carbon-filled surface blocks electrolyte penetration. STEM on cross section in FIG. 15 shows pores still exist internal to the interconnected silicon structure, confirming the high stability and mechanical strength of the silicon-carbon secondary particles.

The silicon-carbon secondary particles for use as anode active materials in lithium-ion batteries described herein have a higher capacity than commercial graphite and SiOx. The silicon-carbon secondary particle has increased electrical conductivity and thus better rate capability than SiOx due to the interconnected conductive structure. The silicon-carbon secondary particle results in a lower volume expansion due to the internal pores and the isotropic swelling of the primary nanoparticles. The silicon-carbon secondary particle results in high $1^{st}$ and cycling CE due to low surface area and low volume change.

An aspect of the disclosed embodiments is a lithium-ion battery. The power generating element of the lithium-ion battery includes a plurality of unit cell layers each including a cathode active material layer, an electrolyte layer and the anode active material layer containing the silicon-carbon secondary particles disclosed herein. The cathode active material layer is formed on a cathode current collector and electrically connected thereto and the anode active material layer is formed on an anode current collector and electrically connected thereto. Each of the electrolyte layers can include a separator serving as a substrate and an electrolyte supported by the separator, or just the electrolyte if no separator is required.

Figure 16:
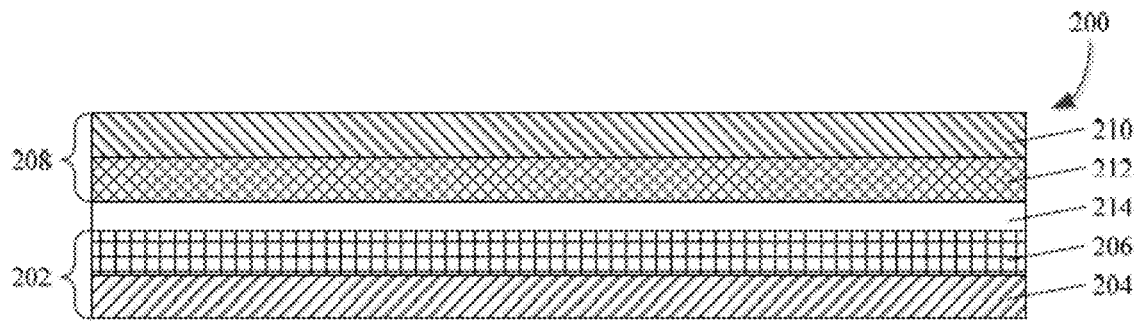
FIG. 16 is a cross-sectional view of a unit cell of the lithium-ion battery.

A unit cell 200 is shown in cross-section in FIG. 16. The lithium ion battery unit cell 200 has an anode 202 with an anode current collector 204 and the anode active material 206 disclosed herein disposed on the anode current collector 204. The lithium ion battery 200 also has a cathode 208 with a cathode current collector 210 and a cathode active material 212 disposed over the cathode current collector 210. The cathode 208 and the anode 202 are separated by a separator 214 and an electrolyte as a non-limiting example.

The cathode current collector 210 can be, for example, an aluminum sheet or foil. Cathode active materials 212 can include one or more lithium transition metal oxides which can be bonded together using binders and optionally conductive fillers such as carbon black. Lithium transition metal oxides can include, but are not limited to, $LiCoO_2$, $LiNiO_2$, $LiNi_{0.5}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. As needed, the cathode active material 212 can contain an electroconductive material, a binder, etc.

The anode active material 206 is the silicon-carbon secondary particles disclosed herein. Further, one or more of a binder and a solvent may be used to prepare a slurry that is applied to the current collector, for example. The anode current collector 204 can be a copper or nickel sheet or foil, as a non-limiting example.

As the electrolyte, a liquid electrolyte, a gel electrolyte, a solid electrolyte or a polymer electrolyte known to those skilled in the art may be used. As examples, the liquid electrolyte may be in the form of a solution in which a lithium salt is dissolved in an organic solvent. The gel electrolyte may be in the form of a gel in which the above mentioned liquid electrolyte is impregnated into a matrix polymer composed of an ion conductive polymer. When the electrolyte layers are formed by a liquid electrolyte or gel electrolyte, a separator 214 may be used in the electrolyte layer. Examples of the separators are porous films of polyolefin such as polyethylene and polypropylene.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. An anode active material comprising:
  a silicon-carbon secondary particle comprising a composite having an exterior conformal carbon coating, the composite comprising:
    type I primary particles each comprising:
      a core particle of interconnected silicon, the interconnected silicon formed of nano-sized silicon particles each connected to at least one other particle;
      inner pores internal to the core particle and defined by the interconnected silicon;
      an internal carbon coating on internal wall surfaces of the inner pores; and
      a conformal carbon coating on the core particle.
2. The anode active material of claim 1, wherein the composite further comprises:
    type II primary particles each comprising a single nano-sized silicon particle having a conformal carbon coating, wherein the type I primary particles and the type II primary particles are loosely bonded, allowing for movement of individual primary particles.

3. The anode active material of claim 2, wherein the composite further comprises:
type III primary particles each comprising multiple nano-sized silicon particles chemically bonded together and conformally coated with carbon, wherein the type I primary particles, the type II primary particles and the type III primary particles are loosely bonded, allowing for movement of individual primary particles.

4. The anode active material of claim 1, wherein the composite further comprises:
type III primary particles each comprising multiple nano-sized silicon particles chemically bonded together and conformally coated with carbon, wherein the type I primary particles and the type III primary particles are loosely bonded, allowing for movement of individual primary particles.

5. The anode active material of claim 1, wherein the inner pores provide each type I primary particle with an inner porosity of between 20% and 30%, inclusive.

6. The anode active material of claim 1, wherein the inner pores have a mean dimension of between 2 nm to 5 nm, inclusive.

7. The anode active material of claim 1, wherein the silicon-carbon secondary particle has a D50 diameter of between 1 μm and 10 μm, inclusive.

8. The anode active material of claim 1, wherein the nano-sized silicon particles each have a longest dimension of 10 nm or less.

9. The anode active material of claim 1, wherein the nano-sized silicon particles have a D50 particle diameter between 3 nm and 6 nm, inclusive.

10. The anode active material of claim 1, wherein the exterior conformal carbon coating of the silicon-carbon secondary particle has a thickness of between 2 nm and 5 nm, inclusive.

11. The anode active material of claim 1, wherein the composite has an internal porosity of between 10% and 40%, inclusive.

12. The anode active material of claim 1, wherein the exterior conformal carbon coating is a graphene coating.

13. The anode active material of claim 1, further comprising an artificial solid electrolyte interphase layer on the exterior conformal carbon coating.

14. The anode active material of claim 1, further comprising a silicon-carbide layer between the internal wall surfaces of the inner pores and the internal carbon coating and between the core particle and the conformal carbon coating, wherein the silicon-carbide layer is amorphous.

15. The anode active material of claim 14, wherein a thickness of the silicon-carbide layer is less than 5 nm.

16. The anode active material of claim 14, wherein a composition of the silicon-carbide layer includes a gradually decreasing amount of silicon towards the internal carbon coating and the conformal carbon coating, and a gradually decreasing amount of carbon towards the core particle.

17. A lithium ion battery, comprising:
an anode having a layer of the anode active material as claimed in claim 1;
a cathode having a layer of cathode active material; and
an electrolyte.

18. Silicon-carbon secondary particles for use as anode active material, each silicon-carbon secondary particle comprising:
type I primary particles each comprising:
a core particle of interconnected silicon, the interconnected silicon formed of nano-sized silicon particles each fused to at least one other nano-sized silicon particle;
inner pores internal to the core particle and defined by the interconnected silicon;
an internal carbon coating on internal wall surfaces of the inner pores; and
a conformal carbon coating on the core particle and sealing the core particle; and
an exterior conformal carbon coating on each type secondary particle, wherein the inner pores provide the type I primary particle with an inner porosity between 20% and 30%, inclusive, and a D50 diameter of the nano-sized silicon particles is between 2 nm and 6 nm, inclusive.

19. The silicon-carbon secondary particles of claim 18, wherein the inner pores have a mean dimension of between 2 nm to 5 nm, inclusive.

20. The silicon-carbon secondary particles of claim 18, wherein a D50 diameter of each silicon-carbon secondary particle is between 1 μm and 10 μm, inclusive.

21. The silicon-carbon secondary particles of claim 18, wherein each silicon-carbon secondary particle has a porosity of between 10% and 40%, inclusive.

22. The silicon-carbon secondary particles of claim 18, further comprising:
type II primary particles each comprising a single nano-sized silicon particle having a conformal carbon coating, wherein the type I primary particles and the type II primary particles are loosely bonded, allowing for movement of individual primary particles.

23. The silicon-carbon secondary particles of claim 22, further comprising:
type III primary particles each comprising multiple nano-sized silicon particles chemically bonded together and conformally coated with carbon, wherein the type I primary particles, the type II primary particles and the type III primary particles are loosely bonded, allowing for movement of individual primary particles.

* * * * *